(12) United States Patent
Naughton

(10) Patent No.: US 6,712,335 B1
(45) Date of Patent: Mar. 30, 2004

(54) FLUID DAMPER

(76) Inventor: Bart Naughton, 1055 Shary Ct., Concord, CA (US) 94518

(*) Notice: Subject to any disclaimer, the term of this patent is extended or adjusted under 35 U.S.C. 154(b) by 56 days.

(21) Appl. No.: 10/153,287

(22) Filed: May 21, 2002

(51) Int. Cl.[7] ............................................. F16K 51/00
(52) U.S. Cl. ........................ 251/212; 251/248; 138/45
(58) Field of Search ............................... 251/212, 279, 251/248; 138/45

(56) References Cited

U.S. PATENT DOCUMENTS

| 916,484 | A | 3/1909 | Pihc | |
|---|---|---|---|---|
| 2,235,731 | A | 3/1941 | Spalding | |
| 3,068,891 | A | 12/1962 | Panning et al. | |
| 3,070,346 | A | 12/1962 | Kennedy | |
| 3,095,178 | A | 6/1963 | Veber | |
| 3,396,904 | A | * 8/1968 | Janette | 251/212 |
| 4,094,492 | A | 6/1978 | Beeman et al. | |
| 4,188,862 | A | 2/1980 | Douglas, III | |
| 4,232,595 | A | * 11/1980 | Cox | 251/212 |
| 4,458,876 | A | * 7/1984 | Schaeper et al. | 251/212 |
| 4,817,508 | A | 4/1989 | Prochnow | |
| D347,471 | S | 5/1994 | DeHerrera | |
| 6,010,113 | A | 1/2000 | Rotering | |

* cited by examiner

Primary Examiner—John Bastianelli
(74) Attorney, Agent, or Firm—Theodore J. Bielen, Jr.

(57) ABSTRACT

A damper utilizing a frame having a base and a wall portion extending outwardly from the same. The wall portion supports a stepped edge which is positioned to at least partially circumvent and aperture formed by the frame. A plurality of flanges are positioned in overlying relationship and slidably move relative to one another by a mechanical mechanism. A plurality of flanges ride on a stepped edge portion to cause fanning of the flanges across the aperture to selectively occlude the aperture or a portion thereof.

12 Claims, 5 Drawing Sheets

FLUID DAMPER

BACKGROUND OF THE INVENTION

The present invention relates to a novel and useful fluid damper.

Dampers are used to control fluid such as air in edifices and other facilities. Airflow control is acutely necessary in clean structures, often requiring dampers in the ceiling and floor.

In the past, dampers have followed two basic designs a "butterfly" and a "split butterfly" arrangement. Both designs utilize a central axis in which blades are extended outwardly and lies perpendicular to the flow of air. Unfortunately, these prior designs suffer from deficiencies in that positioning of the blades or "set" is often lost due to the flow of air against the blades. Thus, the control of airflow via the prior art designs is difficult to achieve. In addition, noise is easily generated by the "butterfly" and "split butterfly" designs. These problems are exacerbated by flow rates of air required by clean room structures.

Prior structures have been proposed to control the flow of air in a ventilation conduit. For example, U.S. Pat. Nos. 916,484 and Des. 347,471 show ventilators and dampers of conventional configuration.

U.S. Pat. Nos. 3,070,346, 3,095,178, and 4,817,508 describe dampers having veins which are rotatable or pivotal within a conduit and include reinforcements to aid in their stability.

U.S. Pat. No. 4,188,862 describes a register assembly in which louvers are rotated about a central hub to control airflow.

U.S. Pat. No. 4,094,492 shows a variable "iris" orifice flow control in which a plurality of blades or flanges open and close in the same manner as a camera shutter.

U.S. Pat. No. 3,068,891 illustrates a flow regulator in which a series of plates are rotated about a central shaft and are cantilevered from the same to control airflow.

U.S. Pat. No. 6,010,113 teaches a damper with fanning blades which are rotatably attached to a central hub. The peripheral ends of the blades fit into a groove to guide the same in a rotary manner.

U.S. Pat. No. 2,235,731 shows a damper in which angularly disposed damper elements arrange to fit on fixed elements to open and close an opening as a damper element is moved through arcuate slots.

A damper which exhibits precise control in high fluid flow conditions would be a notable advance in the mechanical arts.

BRIEF SUMMARY OF THE INVENTION

In accordance with the present invention a novel and useful damper is herein provided.

The damper of the present invention utilizes a frame having a base which may be constructed in an endless configuration such as one that is circular, annular, rectangular, and the like. The base includes a wall portion which extends outwardly from the base and includes an end which is also an endless member. The frame defines an aperture or opening generally used for the passage of air in a fluid or air circulation system such as a conduit. The frame may be fastened to a conduit or filter system by conventional means.

A stepped edge portion is located at the end of the wall portion and is positioned to at least partially circumvent the aperture. The stepped edge portion may be constructed separately and attached to the wall portion, or formed integrally therewith. The frame, and its components described above, may be manufactured from any rigid or semi-rigid material such as metal, ceramics, plastics, and the like.

A plurality of flanges or blades are also employed in the present invention. At least a first and a second flange are used and are positioned in overlying relationship to one another. Thus, the first flange is movable relative to the second flange in a sliding relationship. An appropriate number of flanges are employed to close or occlude the aperture formed by the frame when the flange is fanned out or spread across the aperture in such sliding arrangement. The flanges are supported by a central hub which may be turned using any mechanical means, and may be locally or remotely operated. Of course, the central hub may be turned or rotated using automatic controls known in the art.

Means is also provided in the present invention for moving the first and second flanges relative to one another in an overriding relationship. Such means may be manual or take the form of a motor known in the art. The motor may transmit such rotary motion via the shaft and a gearing arrangement of conventional configuration. The plurality of flanges ride on the step edge portion of the frame during overriding movement relative to one another. The stepped edge portion serves to guide and to uniformly spread the plurality of flanges across the aperture during the process of closing or occluding of the aperture. Such movement may be accomplished by using a pair of wheels, a first wheel pivotally linked to the first flange and a second wheel rotatable relative to a bracket supported by the frame. The second wheel may serve as an extension of the shaft that is movable manually by a motor, remotely or locally. The wheels may take the form of gears to more positively control the movement of the first flange relative to the aperture of the frame.

Linking means is also provided for permitting the first flange to engage the second flange and to pull the same in a rotational manner about the central pivot. Such linking means may include a tab formed on the first flange and a slot constructed on the second flange such that the tab locates within the slot and may travel therewithin. Of course, movement of the second flange occurs when the tab of the first flange contacts an edge of the slot. Moreover, such linking means may be used between successive flanges or blades of any number to permit the same to rotate about a central pivot located above the aperture of the frame.

It may be apparent that a novel and useful fluid damper has hereinabove been described.

It is therefore an object of the present invention to provide a fluid damper which very accurately controls the flow of air in a ventilation system.

Another object of the present invention is to provide a fluid damper which is not susceptible to loss of a "set" due to the flow of fluid or air in a ventilation system.

Another object of the present invention is to provide a fluid damper which greatly eliminates noise associated with dampers of the prior art.

A further object of the present invention is to provide a fluid damper which exhibits great durability and may be used in air circulation systems having a high rate of flow.

Yet another object of the present invention is to provide a fluid damper system which is easily adaptable to clean room structures requiring precise control of airflow.

Another object of the present invention is to provide a fluid damper which very accurately controls the flow of fluid in a circulation system and is easy to manufacture, having a minimum of moving parts.

Yet another object of the present invention is to provide a fluid damper which greatly reduces the leakage of fluid through the damper when the damper is in its occluded configuration.

The invention possesses other objects and advantages especially as concerns particular characteristics and features thereof which will become apparent as the specification continues.

For a better understanding of the invention reference is made to the following detailed description of the preferred embodiments thereof which should be taken in conjunction with the prior described drawings.

DETAILED DESCRIPTION OF THE PREFERRED EMBODIMENTS OF THE INVENTION

Various aspects of the present invention will evolve from the following detailed description of the preferred embodiments thereof which may be fully understood by reference to the herein above-delineated drawings.

Figure 1:
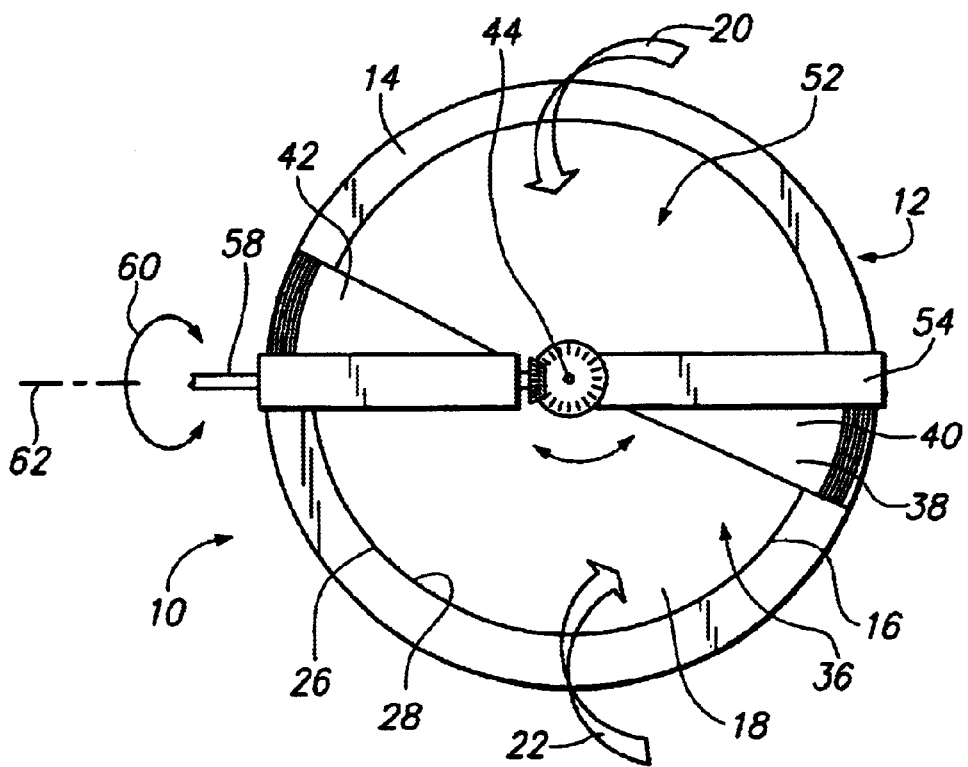
FIG. 1 is a top plan view of the damper of the present invention shown in its open position.
Figure 2:
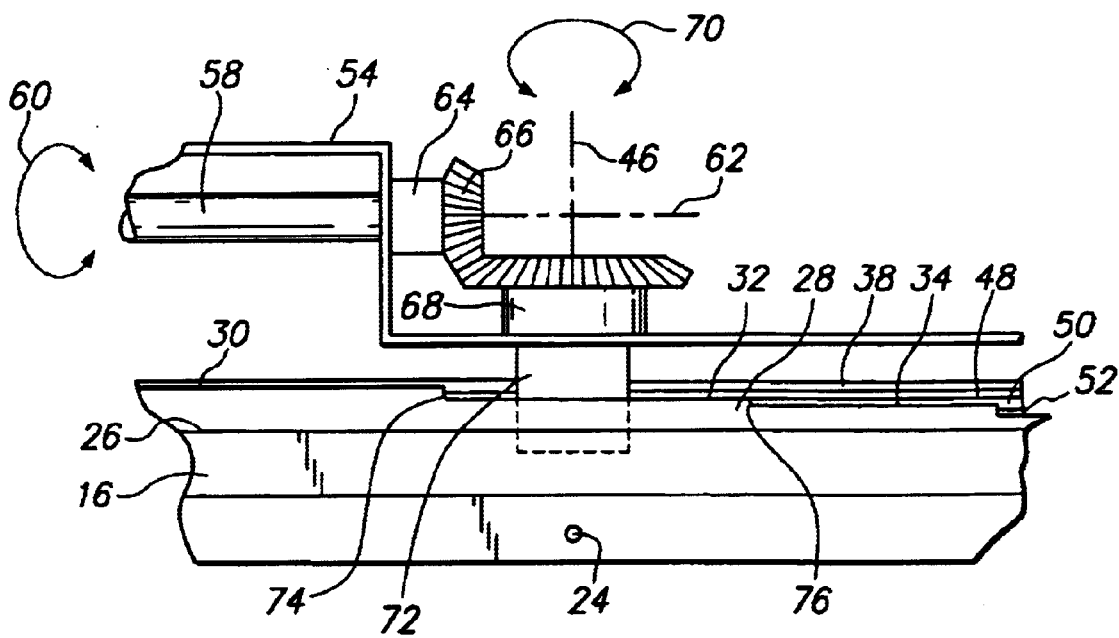
FIG. 2 is a side elevational view of the central pivoting portion causing rotation of the primary flange about an axis.

The preferred embodiment of the invention is shown in the drawings by reference character 10. Damper 10 includes as one of its elements a frame 12. Frame 12 possesses a base 14 and includes a wall portion 16 which extends outwardly therefrom. Frame 12 forms an aperture or opening 18 through the same which is generally used to direct the passage of fluids such as air, directional arrows 20 and 22, FIG. 1. Frame 12 may be constructed of metallic material, although other materials such as composites plastics, and the like would suffice in this regard. Frame 12 is mounted within a ventilation system adjacent a filter or within a duct by conventional means such as fasteners, clamps, and the like. Opening 24, FIG. 2, may be employed to accept a fastener in this regard. Wall portion 16 includes an end 26 which substantially surrounds aperture 18. A stepped edge portion 28 is located at end 26 of wall portion 16. As depicted in FIG. 2, stepped edge portion 28 includes distinct levels or flattened areas 30, 32, and 34. Stepped edge portion 28 may be formed integrally with wall portion 16 or separately and attached to wall portion 26 by any suitable means such as rivets, fasteners, glues welding, and the like.

A plurality of flanges or blades 36 are positioned in overlying relationship with one another. FIG. 1 represents the stacked arrangement of plurality of plates 36. For example, blade 38 which is the prime moving blade, is shown as a one-piece element having flared portions 40 and 42 at its extremities. Each blade of plurality of blades 36 includes this general configuration. Plurality of blades 36 stacked upon one another are capable of fanning outwardly in about pivot pin 44. Pivot pin 44 lies along axis 46 which is centrally located in aperture 18. FIG. 2 also illustrates flanges 48, 50, and 52 which are stacked in that order beneath flange 38. It should be noted that flange 38 is overall shorter in length than the next succeeding flange 48 which is shorter than the next succeeding flange 50, and so on, to provide the stacking arrangement depicted in FIG. 1. In general, flange 38 is slidably movable relative to flange 48 and so forth through succeeding flanges to create a fan-like expansion over aperture 18, which will be described in greater detail as the specification continues.

Pivot pin 44 along axis 46 is supported by bracket 54 which spans frame 12. Bracket 54 is held in place by any suitable means such as rivets, fasteners, and the like. Pivot pin 44 serves as the central focal place for the expansion and contraction of flanges 36.

Means 56 is also found in the present invention for moving flange 38 relative to flange 48 and successive flanges stacked one upon the other. Means 56 may take the form of a shaft 58 which may be manually turned or rotated by a motor in a conventional manner. Directional arrow 60 on FIG. 1 indicates the rotational movement of shaft 58 along axis 62, also shown in FIG. 2. Shaft 58 is fixed to rotatable wheel or gear 64 having a mitered surface 66. Gear 64, fixed to pivot pin 44, meshingly engages gear or wheel 68 which rotates according to directional arrow 70 about axis 46. Of course, other structures may be employed to turn pivot pin 44 and plurality of flanges 36, such as a flexible rotatable cable, and the like. Prime moving flange 38 is fixed to neck 72 of gear 68 by the use of welding, fasteners, springs, clamps, and any other conventional structure in this regard. Needless to say, the rotation of gear 68 also turns flange 38 about axis 46 such that the flared portions 40 and 42 of flange 38 sweep across aperture 18. Flange 38 also rides on stepped edge portion 28, specifically level 30, depicted in FIG. 2. In addition, flange 48 rides on level 32 and is prevented from further rotational movement about axis 46 by rise 74. Rise 76 stops the further rotational movement of flange 50 along level 34 and so on. Thus, plurality of flanges 36 create an evenly spaced fan-like structure across aperture 18 when in the occluded configuration, FIG. 5.

Figure 4:
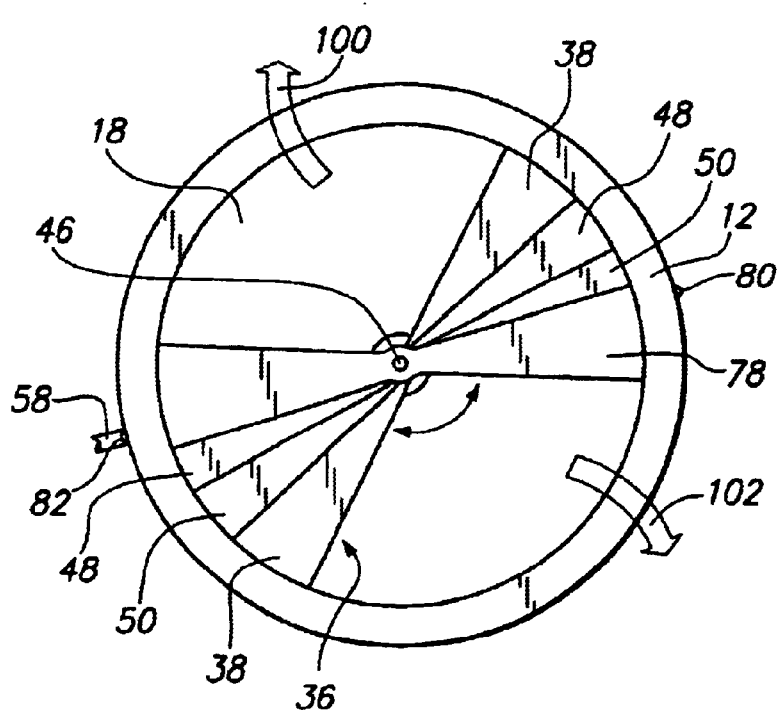
FIG. 4 is a bottom plan view of the damper of the present invention in a partially occluded position.
Figure 5:
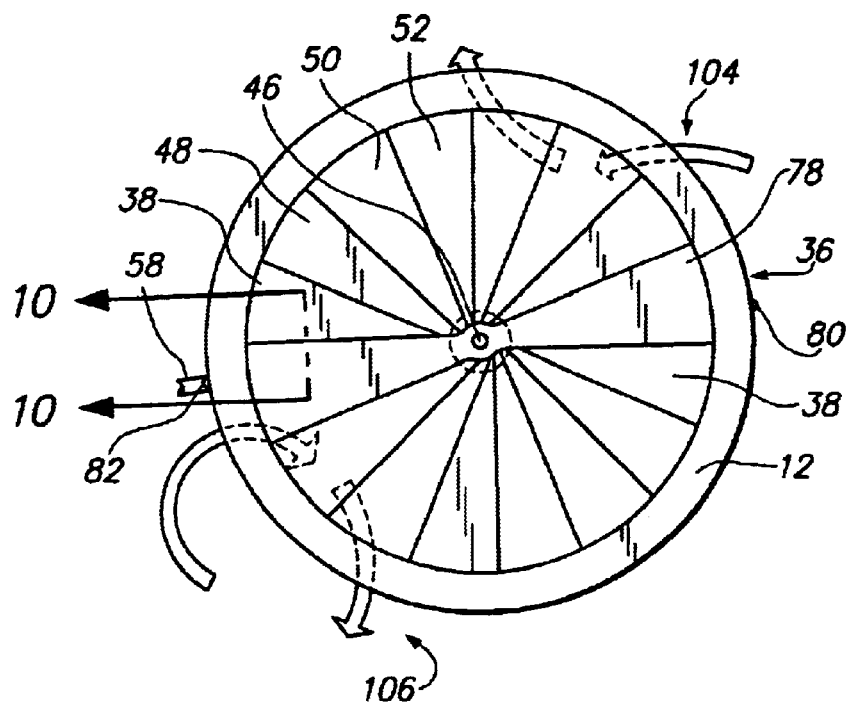
FIG. 5 is a bottom plan view of the damper of the present invention in a completely occluded position.

FIGS. 4–5 indicate the successive movements of plurality of flanges 38 about axis 46. Flange 78 represents a fixed member which serves as an anchor to prevent further movement of plurality of flanges 36 when they are in the configuration depicted in FIG. 5. Fixed flange 78 is connected to bracket 54 by a pin or tab 80. Another pin or tab 82 holds flange 78 to bracket 54 in the vicinity of shaft 58.

Figure 6:
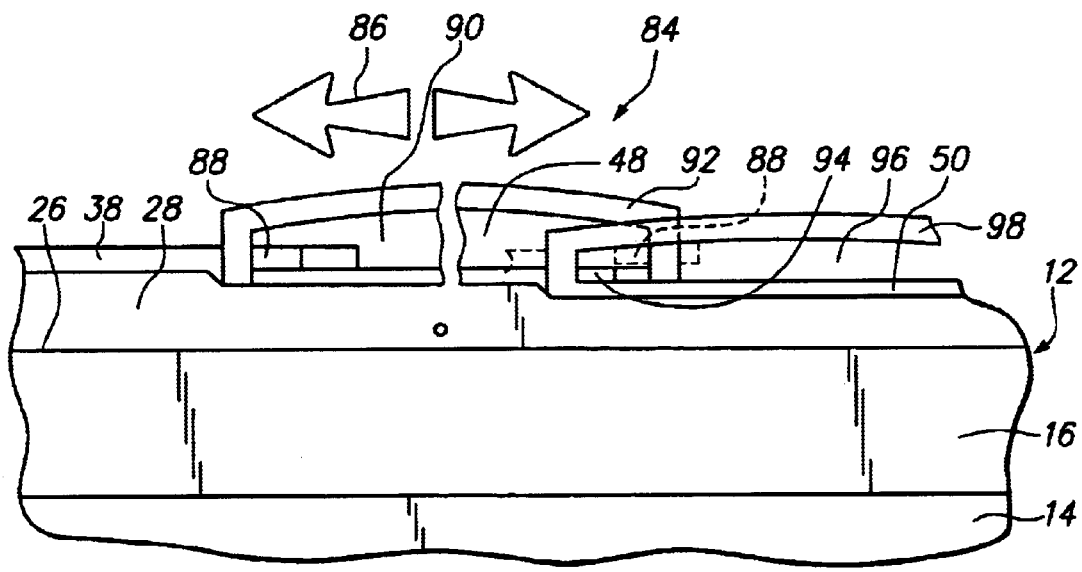
FIG. 6 is a broken side elevational view showing the linking means and step guiding edge portion employed during fanning of the multiplicity of flanges.
Figure 7:
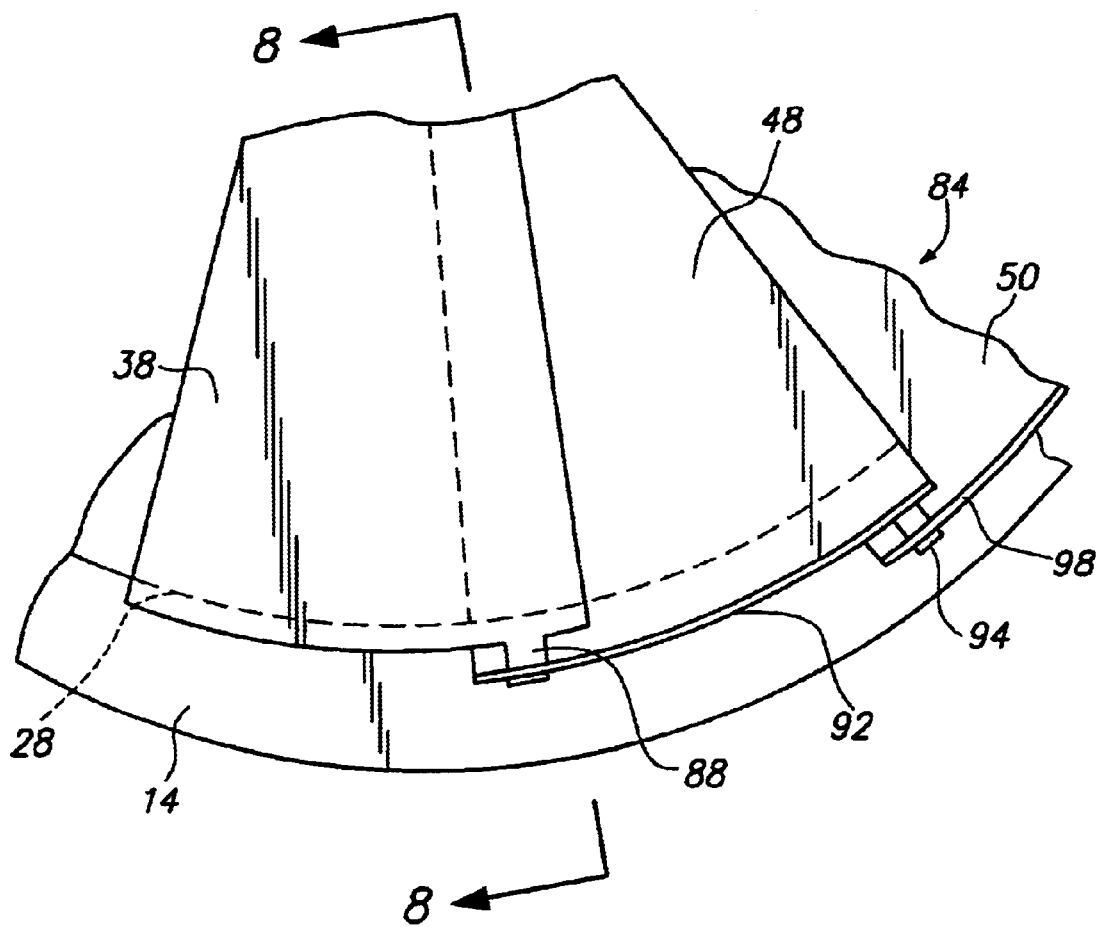
FIG. 7 is a partially broken top plan view depicting the linking means shown in FIG. 6.
Figure 8:
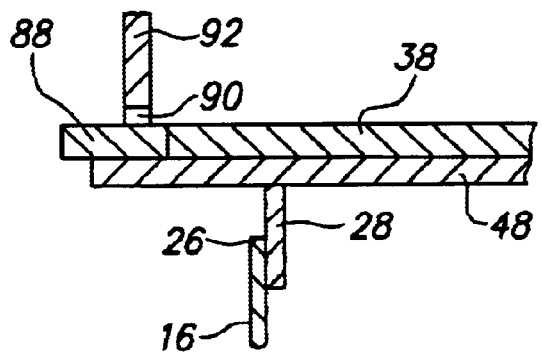
FIG. 8 is a sectional view taken along line 8—8 of FIG. 7.

Although flange 38 comprises the prime-moving flange in the system of the present invention, linking means 84, FIGS. 6–8 permits the engagement of flange 38 with flange 48. In turn, flange 48 engages flange 50, and so on through successive plurality of flanges 36. Other than prime moving flange 38 and fixed flange 78, the remaining plurality of flanges 36 may be deemed slave flanges since they are essentially pulled through linking means 84 by the motivation of flange 38. Directional arrows 86 indicate the back and forth movement of plurality of flanges 36 through linking means 84.

Viewing now flange 38 on FIGS. 6–8, it may be observed that a tab 88 fits within a slot 90 formed by an arch 92 which may be integrally formed with flange 48 or connected thereto. It should be noted that tab 88 is free to move within slot 90 to the extremities afforded by arch 92. FIG. 6 represents the extreme positioning of flange 38 to the left in solid lines and the extreme positioning of flange 38 to the right in broken lines. Likewise, flange 48 includes a tab 94 which lies within the slot 96 formed by arch 98 of flange 50. Thus, through the use of tabs and slots associated with successive plurality of flanges 36, prime moving flange 38 opens and closes plurality of flanges 36 as shown in FIGS. 3–5.

Figure 3:
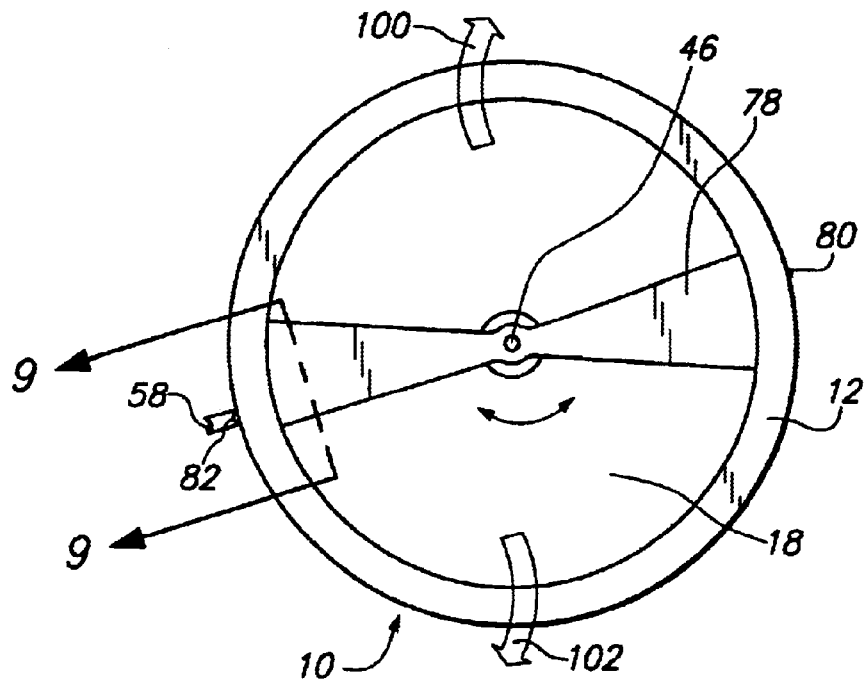
FIG. 3 is a bottom plan view of the damper of the present invention in its open position.
Figure 9:
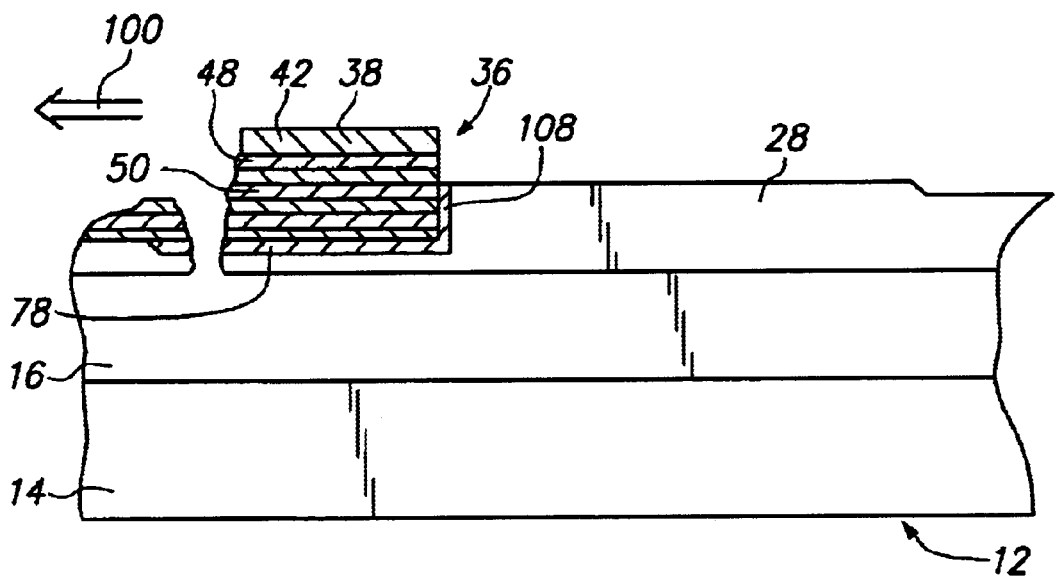
FIG. 9 is a sectional view taken along line 9—9 of FIG. 3.
Figure 10:
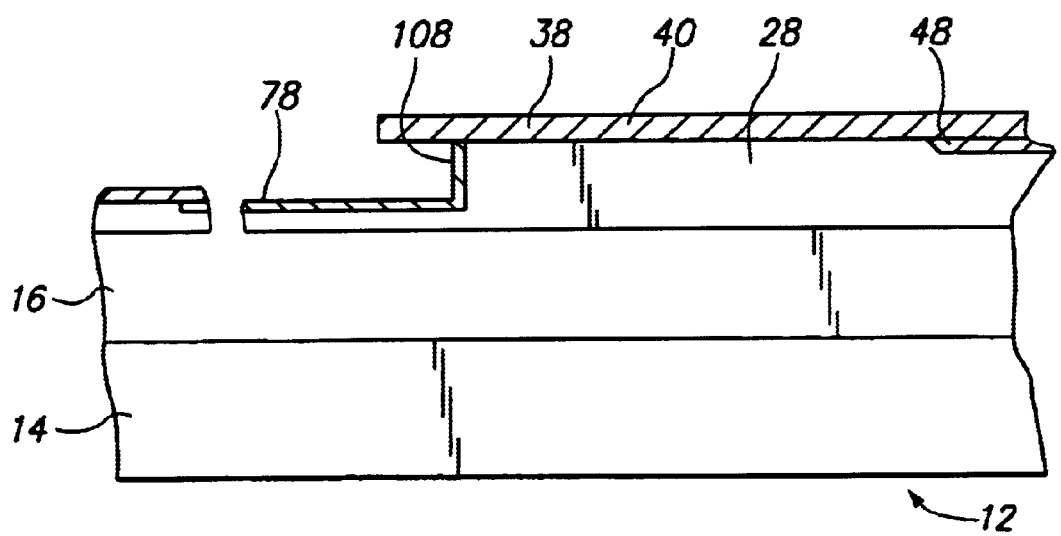
FIG. 10 is a sectional view taken along line 10—10 of FIG. 5.

Viewing now FIG. 9, plurality of flanges 36 are stacked in the open configuration of FIG. 3. Fixed flange 78 is depicted in detail and possesses a fence 108 which serves as a stop for plurality of flanges 36. As plurality of flanges 36 fan out across aperture 18 during occlusion, directional arrow 110, flared portion 42 of prime moving flange 38 overrides flange 48. FIG. 10 represents of occluded position of damper 10 of FIG. 5 where fence 108 serves to seal flared portion 40 of flange 38. Such sealing achieves the low leakage characteristics of damper 10 when plurality of flanges are in the occluded configuration of FIG. 5.

In operation, the user utilizes manual or motor means to turn shaft 58, locally or remotely, which, in turn, rotates gear 64 about axis 62. Gear 64 engaging gear 68 turns gear 68 and prime moving blade 38 attached thereto. Such action will spread or collapse plurality of flanges 36 to open or close aperture 18 formed by frame 12 according to FIGS. 3–5. Temporary adhesion between individual flanges of plurality of flanges 36 will not prevent the spreading of plurality of flanges since they are interconnected through linking means 84. Directional arrows 100 and 102 on FIG. 3 indicates the free movement of air through damper 10 on the side of damper 10 shown in FIG. 1 and indicated by directional arrows 20 and 22. Fluid or air passing through damper 10 will tend to press plurality of flanges 36 upon frame 12, specifically stepped end portion 28, as the direction of flow or air through damper 10 is along axis 46. The opening of aperture 18 may be adjusted by the turning of shaft 58 to a position desired by the user which controls the flow of air through aperture 18 and the ventilation system associated with damper 10. FIG. 5 indicates the damper 10 has been completely closed blocking air from passing in either direction through damper 10. Pairs of directional arrows 104 and 106 are shown partially in phantom to indicate that air is pressing on the opposite side of that depicted in FIG. 5 and cannot pass through damper 10 in its closed position. Linking means 84 permits the opening and closing of damper 10 by the motivation of prime moving flange 38. Fixed flange 78 anchors the further movement of plurality of flanges 36 about axis 46 when damper 10 is in the is position depicted in FIG. 3 or FIG. 5, completely open or completely closed.

While in the foregoing, embodiments of the present invention have been set forth in considerable detail for the purposes of making a complete disclosure of the invention, it may be apparent to those of skill in the art that numerous changes may be made in such detail without departing from the spirit and principles of the invention.

What is claimed is:

1. A fluid damper, comprising:

a. a frame, said frame comprising a base, a wall portion extending outwardly from said base, said wall portion possessing an end said frame defining an aperture therethrough;

b. a stepped edge portion located at said end of said wall portion said stepped edge positioned to at least partially circumvent said aperture;

c. a first flange and a second flange, said first flange positioned in overlying relationship with said second flange, said first flange being moveably relative to said second flange in said overlying relationship; and d. means for moving said first flange relative to said second flange, said first and second flanges riding on said stepped edge portion to move from a first position leaving said aperture open to a second position closing said aperture.

2. The damper of claim 1 in which said means for moving said first and second flanges comprises a bracket, and a pivot supported by said bracket, said first and second flanges being linked to said pivot, and means for rotating said pivot.

3. The damper of claim 2 in which said means for rotating said pivot includes a first wheel connected to said pivot, a second wheel frictionally engaging said first wheel, and a rotatable shaft connected to said second wheel.

4. The damper of claim 3 in which said first and second wheels are gears.

5. The damper of claim 4 in which said first wheel rotates about a first axis and said second wheel rotates about a second axis, said first axis lying perpendicular to said second axis.

6. The damper of claim 1 which additionally comprises a linking means for permitting said first flange to engage said second flange for pulling said second flange by said first flange.

7. The damper of claim 6 in which said linking means comprises a tab formed on said first flange and a slot formed on said second flange said tab located in said slot and being movable therewithin.

8. The damper of claim 6 in which said means for moving said first and second flanges comprises a bracket, and a pivot supported by said bracket, said first and second flanges being linked to said pivot, and means for rotating said pivot.

9. The damper of claim 8 in which said means for rotating said pivot includes a first wheel connected to said pivot, a second wheel frictionally engaging said first wheel, and a rotatable shaft connected to said second wheel.

10. The damper of claim 9 in which said first and second wheels are gears.

11. The damper of claim 10 in which said first wheel rotates about a first axis and said second wheel rotates about a second axis, said first axis lying perpendicular to said second axis.

12. The damper of claim 11 in which said linking means comprises a tab formed on said first flange and a slot formed on said second flange said tab located in said slot and being movable therewithin.

* * * * *